US012756776B2

(12) United States Patent
Smith

(10) Patent No.: US 12,756,776 B2
(45) Date of Patent: Oct. 6, 2026

(54) DETECTION AND METHODS FOR HANDLING A TDOS ATTACK

(71) Applicant: Intrado Life & Safety, Inc., Longmont, CO (US)

(72) Inventor: Carleton A. Smith, Westminster, CO (US)

(73) Assignee: Intrado Life & Safety, Inc., Longmont, CO (US)

( * ) Notice: Subject to any disclaimer, the term of this patent is extended or adjusted under 35 U.S.C. 154(b) by 221 days.

(21) Appl. No.: 18/394,986

(22) Filed: Dec. 22, 2023

(65) Prior Publication Data

US 2025/0211673 A1 Jun. 26, 2025

(51) Int. Cl.
*H04M 3/22* (2006.01)
*H04M 3/42* (2006.01)

(52) U.S. Cl.
CPC ..... *H04M 3/2281* (2013.01); *H04M 3/42042* (2013.01); *H04M 2203/551* (2013.01)

(58) Field of Classification Search
CPC ........... H04M 3/2281; H04M 3/42042; H04M 2203/551
USPC ....................................................... 379/32.01
See application file for complete search history.

(56) References Cited

U.S. PATENT DOCUMENTS

| | | | | |
|---|---|---|---|---|
| 6,917,940 | B1 * | 7/2005 | Chen | H04M 15/43 707/999.102 |
| 7,653,188 | B2 * | 1/2010 | Kloberdans | H04M 3/436 379/189 |
| 9,800,722 | B1 * | 10/2017 | Wu | H04M 3/2272 |
| 10,554,821 | B1 * | 2/2020 | Koster | H04M 3/436 |
| 10,601,986 | B1 * | 3/2020 | Botner | H04M 3/4365 |
| 2009/0253399 | A1 * | 10/2009 | Snapp | H04W 4/90 455/414.1 |
| 2009/0293123 | A1 * | 11/2009 | Jackson | H04L 63/1458 726/23 |
| 2012/0243466 | A1 * | 9/2012 | Hagens | H04L 67/52 370/328 |
| 2015/0350075 | A1 * | 12/2015 | Li | H04L 45/18 709/224 |

* cited by examiner

*Primary Examiner* — Binh Kien Tieu
(74) *Attorney, Agent, or Firm* — PATENT CAPITAL GROUP

(57) ABSTRACT

A method includes receiving a first call; identifying a first telephone number associated with the first call; receiving a second call; identifying a second telephone number associated with the second call; determining to banish the second call, at least in part based the second telephone number and a determination that a number of calls associated with the first telephone number exceeds a predetermined threshold; and banishing the second call.

20 Claims, 8 Drawing Sheets

ABANDONED TN

| TN | COUNT | OCCURRED TIME | ITG NAME | TRUNK-CONTEXT | TGRP |
|---|---|---|---|---|---|

TDOS TN

| TN | COUNT | START TIME | ITG NAME | TRUNK-CONTEXT | TGRP | TDOS ATTACK | BANISH ATTEMPTS | INTERROGATE | INTERROGATE COUNT | TDOS INHIBIT SEND |
|---|---|---|---|---|---|---|---|---|---|---|

FIG. 4

DETECTION AND METHODS FOR HANDLING A TDOS ATTACK

BACKGROUND

Technical Field

This disclosure relates to telephonic communication and, in particular, to handling a telephony denial of service attack.

Related Art

Telephony denial of service (TDOS) attacks have increased in recent years. TDOS attacks are problematic in that they can consume resources of a mobile positioning center (MPC), a Voice over Internal Protocol (VOIP) positioning center (VPC), an emergency call management center (ECMC), and a public safety answering point (PSAP), as well as ingress resources.

A TDOS attack typically includes repeated calls received between one second and one minute apart. The caller typically abandons these calls quickly, such as within two seconds. A TDOS attack can last for hours or even days.

To date, all attacks have been VOIP or wireless callers, although attackers are expected to try different communication technologies. Thus, the calls ingress as 911/pseudo automatic number identification (pANI) numbers.

These pANI numbers exist within a pool of telephone numbers specific to each wireless carrier and are assigned to each call. When the pool of telephone numbers is exhausted, the system uses a sentinel telephone number (TN) as a pANI of last resort. The sentinel TN is then used in all subsequent calls until a reset occurs. Typically, a location is associated with a call. However, because the same sentinel TN is used for all calls, the location of the caller is lost or not available.

TDOS attacks rapidly deplete the pANI pool. To reset the pool, the pANIs have to age out following a call for five to thirty minutes. If the pANI pool is large (e.g., for a busy metro PSAP), then loss of location can linger after the attack.

Further, if the attack is ongoing when a pool member is returned to the pool, that number is, most likely, consumed again by the attack. Thus, real calls compete against the attack for pool resources.

BRIEF SUMMARY

In a first implementation of the present disclosure, a method includes receiving a first call; identifying a first telephone number associated with the first call; receiving a second call; identifying a second telephone number associated with the second call; determining to banish the second call, at least in part based the second telephone number and a determination that a number of calls associated with the first telephone number exceeds a predetermined threshold; and banishing the second call.

A second implementation is the first implementation, wherein the first telephone number is a call back number for the first call, and the second telephone number is a call back number for the second call.

A third implementation is the second implementation, further comprising: recording a first ingress trunk group of the first call, at least in part based on the determination that the number of calls associated with the first telephone number exceeds the predetermined threshold; and determining whether the first telephone number matches the second telephone number, at least in part based on the first ingress trunk group and a second ingress trunk group of the second call.

A fourth implementation is any of the first through third implementations, wherein the determining to banish the second call is performed at least in part based on the determination that the number of calls associated with the first telephone number exceeds the predetermined threshold.

A fifth implementation is any of the first through fourth implementations, wherein the first telephone number is a pseudo Automatic Number Identification (pANI) number, a call back number, a pilot telephone number, or an Automatic Location and Information (ALI) location telephone number.

A sixth implementation is any of the first through fifth implementations, further comprising: interrogating the second call, at least in part based on a determination that a telephone number associated with the first call or the second call has been banished more than a predetermined number of times.

A seventh implementation is any of the first through sixth implementations, further comprising: ending the second call, at least in part based on a determination that a number of interrogations exceeds a predetermined threshold.

In an eighth implementation, an apparatus includes a network interface that receives a first call and a second call; and a processor configured to identify a first telephone number associated with the first call, to identify a second telephone number associated with the second call, and to determine to banish the second call, at least in part based the second telephone number and a determination that a number of calls associated with the first telephone number exceeds a predetermined threshold, wherein the second call is banished.

A ninth implementation is the eighth implementation, wherein the first telephone number is a call back number for the first call, and the second telephone number is a call back number for the second call.

A tenth implementation is the ninth implementation, wherein the processor is further configured to record a first ingress trunk group of the first call, at least in part based on the determination that the number of calls associated with the first telephone number exceeds the predetermined threshold, and the processor is further configured to determine whether the first telephone number matches the second telephone number, at least in part based on the first ingress trunk group and a second ingress trunk group of the second call.

An eleventh implementation is any of the eighth though tenth implementations, wherein the processor is further configured to determine to banish the second call at least in part based on the determination that the number of calls associated with the first telephone number exceeds the predetermined threshold.

A twelfth implementation is any of the eighth through eleventh implementations, wherein the first telephone number is a pseudo Automatic Number Identification (pANI) number, a call back number, a pilot telephone number, or an Automatic Location and Information (ALI) location telephone number.

A thirteenth implementation is any of the eighth through twelfth implementations, wherein the second call is interrogated, at least in part based on a determination that a telephone number associated with the first call or the second call has been banished more than a predetermined number of times.

A fourteenth implementation is any of the eighth through thirteenth implementations, wherein the second call is ended, at least in part based on a determination that a number of interrogations exceeds a predetermined threshold.

In a fifteenth implementation, a computer-readable medium includes instructions that, when executed by a processor, perform operations including receiving a first call; identifying a first telephone number associated with the first call; receiving a second call; identifying a second telephone number associated with the second call; and determining to banish the second call, at least in part based the second telephone number and a determination that a number of calls associated with the first telephone number exceeds a predetermined threshold, wherein the second call is banished.

A sixteenth implementation is the fifteenth implementation, wherein the first telephone number is a call back number for the first call, and the second telephone number is a call back number for the second call.

A seventeenth implementation is the sixteenth implementation, the operations further comprising: recording a first ingress trunk group of the first call, at least in part based on the determination that the number of calls associated with the first telephone number exceeds the predetermined threshold; and determining whether the first telephone number matches the second telephone number, at least in part based on the first ingress trunk group and a second ingress trunk group of the second call.

An eighteenth implementation is any of the fifteenth through seventeenth implementations, wherein the determining to banish the second call is performed at least in part based on the determination that the number of calls associated with the first telephone number exceeds the predetermined threshold.

A nineteenth implementation is any of the fifteenth through eighteenth implementations, wherein the first telephone number is a pseudo Automatic Number Identification (pANI) number, a call back number, a pilot telephone number, or an Automatic Location and Information (ALI) location telephone number.

A twentieth implementation is any of the fifteenth through nineteenth implementations, wherein the second call is interrogated, at least in part based on a determination that a telephone number associated with the first call or the second call has been banished more than a predetermined number of times.

A twenty-first implementation is any of the fifteenth through twentieth implementations, the operations further comprising: ending the second call, at least in part based on a determination that a number of interrogations exceeds a predetermined threshold.

In a twenty-second implementation, an apparatus includes means for receiving a first call and a second call; and processing means for identifying a first telephone number associated with the first call, for identifying a second telephone number associated with the second call, and for determining to banish the second call, at least in part based the second telephone number and a determination that a number of calls associated with the first telephone number exceeds a predetermined threshold, wherein the second call is banished.

A twenty-third implementation is the twenty-second implementation, wherein the first telephone number is a call back number for the first call, and the second telephone number is a call back number for the second call.

A twenty-fourth implementation is the twenty-third implementation, wherein the processing means records a first ingress trunk group of the first call, at least in part based on the determination that the number of calls associated with the first telephone number exceeds the predetermined threshold, and determines whether the first telephone number matches the second telephone number, at least in part based on the first ingress trunk group and a second ingress trunk group of the second call.

A twenty-fifth implementation is the any of the twenty-second through twenty-fourth implementations, wherein the processing means determines to banish the second call at least in part based on the determination that the number of calls associated with the first telephone number exceeds the predetermined threshold.

A twenty-sixth implementation is any of the twenty-second through twenty-fifth implementations, wherein the first telephone number is a pseudo Automatic Number Identification (pANI) number, a call back number, a pilot telephone number, or an Automatic Location and Information (ALI) location telephone number.

A twenty-seventh implementation is any of the twenty-second through twenty-fifth implementations, wherein the second call is interrogated, at least in part based on a determination that a telephone number associated with the first call or the second call has been banished more than a predetermined number of times.

A twenty-eighth implementation is any of the twenty-second through twenty-seventh implementations, wherein the second call is ended, at least in part based on a determination that a number of interrogations exceeds a predetermined threshold.

BRIEF DESCRIPTION OF THE SEVERAL VIEWS OF THE DRAWINGS

FIG. 4 illustrates an exemplary Abandoned TN data structure and an exemplary TDOS TN data structure, according to an implementation of the present disclosure.

DETAILED DESCRIPTION

Currently, there are two methods of detecting a TDOS attack: manual and automatically via an event evaluation program.

Figure 1:
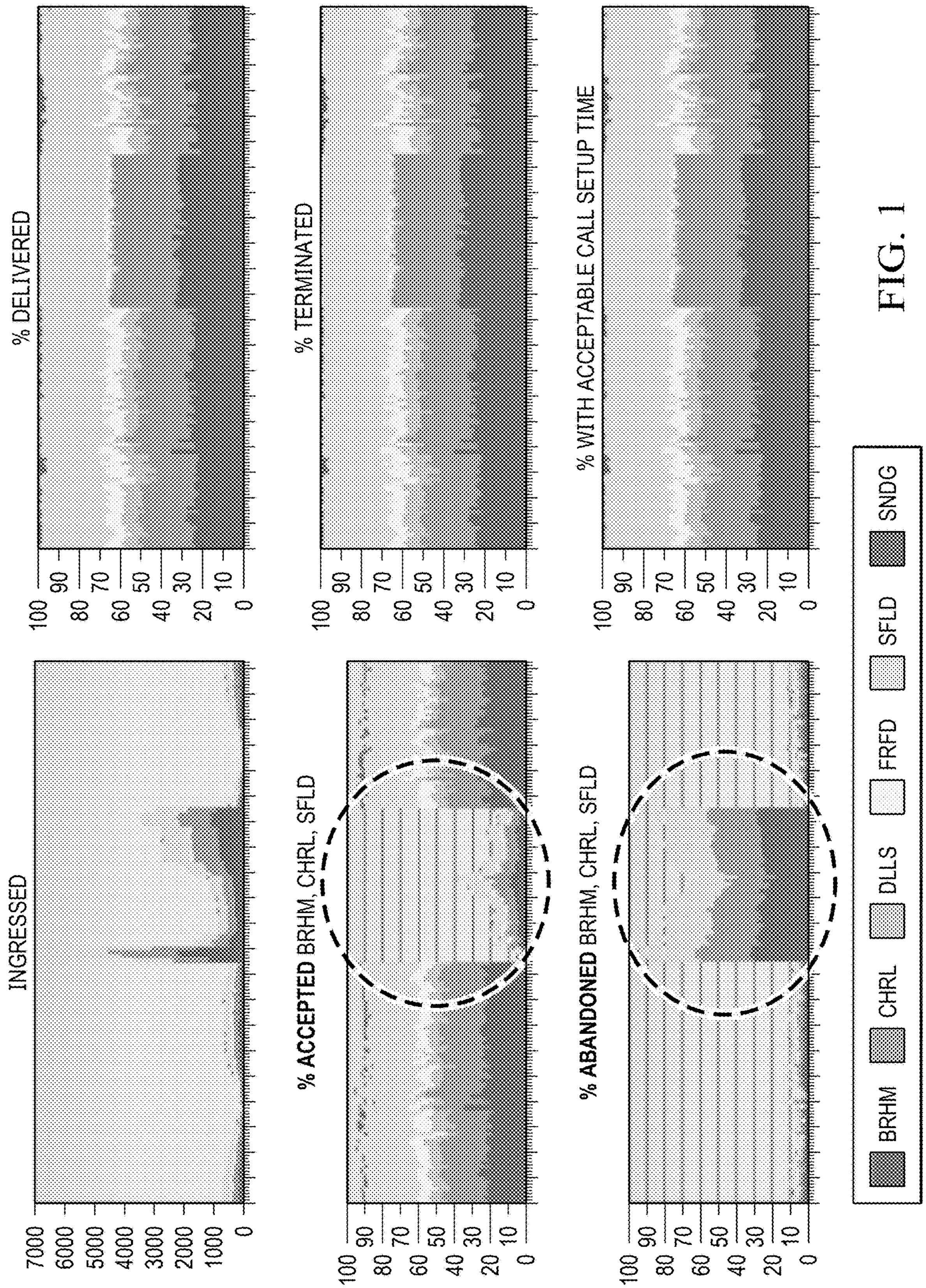
FIG. 1 illustrates an example of an attack with a manifestation in a call status display.

One indication of a TDOS attack is via peg count monitor (PCM) alarms and a Call Status Display (CSD). PCM is a process that generates alarms when thresholds of anomalies are crossed. For example, one such threshold can be a percentage of calls within a time window for which the software handling a call does not send an Invite to a PSAP. The CSD can show TDOS attacks as an excessive percentage of calls abandoned and an excessive percentage of calls accepted, as shown in FIG. 1. However, other kinds of events, such as a mass calling event resulting from a road accident, that are not TDOS attacks can cause PCM and the CSD to show alarms.

Therefore, in manual detection, when the two panels in the CSD become red (and the PCM alarms are in the monitoring system), a user reviews the PCM Alarms section of the CSD display. The CSD display shows, for each alarm that was generated, a list of PSAPs and Common Call Keys (CCKs). Because about 8% of enhanced 911 (E9-1-1) calls normally are abandoned, the user looks in the CSD display for a PSAP that has more abandoned calls than others.

FIG. 1 shows an example of an attack with the manifestation in the CSD. As shown in the circled portion of FIG. 1, the attack generated a discontinuous impact on the CSD graphs.

Then, the user can perform a call detail record (CDR) search in the timeframe indicated by the alarm and the specific PSAP. The search can be further narrowed to abandoned calls. If the user sees the same automatic number identification (ANI)/pANI repeatedly, a TDOS attack likely is in-progress. The user could then "watch" CDRs for a few minutes for that PSAP.

Automatic detection by software works similarly. In particular, the software looks for abandoned calls in a sequence that have a pattern, such as the same ANI/pANI. The software can use tunable thresholds to declare an attack, such as a predetermined number of calls abandoned in a predetermined amount of time, where the telephone number (TN) (e.g., ANI/pANI) was the same.

From this foundation, the present inventor has identified the following call characteristics of a TDOS attack.

First, the same ANI (or pANI) makes repeated calls within one second to one minute of each other. The rate of the attack depends on whether the attack is from an auto-dialer/computer-generated call or a human-generated call. Thus far, only in rare instances was there was no ANI or a constructed ANI (e.g., 000-911-xxxx, where xxxx refers to a trunk group). In the case of a pANI, for calls to get the same ANI/pANI repeatedly, the attack must have cycled through all of the pANIs in the pANI pool. When that happens, the sentinel member is returned for the calls. The locations for those calls are undetermined because all calls using that pANI are sharing the sentinel pANI. Further, wireless pANIs are allocated by carrier. So, when the same pANI appears over and over in an attack, the originating device is from a specific wireless carrier. The reason is that other callers from other wireless carriers will get pANIs from a distinct pANI pool, because these calls would not look like a TDOS attack.

Next, the caller abandons the call within 1 to 2 seconds of receipt. Even though the caller hung up, the system delivers the call to the PSAP. The PSAP then engages in their abandoned call procedures.

To remedy this problem, some implementations of the present disclosure respond to the caller by "banishing" the caller, that is, sending back an error/cause code such that the caller believes the number they dialed is unallocated (e.g., not an assigned number).

Four tests of the latter-described algorithms of the present disclosure were performed. In three of these tests, the attacker attempted four calls within two seconds. The system then sent the attacker an unallocated number response, and the attack then ceased.

In the other of the tests, the attacker attempted 12 calls within ten seconds. The attack again ceased, when the attacker received the unallocated number response.

From the time the response is triggered, the total event time of the attack can be less than one minute. For wireless (and VoIP) calls, there can be residual damage in which the location of callers is impaired, while the pANIs age back into the pool. This aging lasts between 5 and 30 minutes, depending on the configuration.

During an actual attack, the call duration (e.g., the time to abandon) was under one second, and the time between calls was just under two seconds. Once an implementation of the present disclosure started operating, the attack stopped just over two seconds later. The error code was sent back to the attacker less than 1 millisecond after their Invite was received. The attacker immediately (less than 100 ms later) sent the Invite again, which again resulted in the system sending the error code. The attacker waited about two seconds and tried again. Once more, within a millisecond, the system sent back an error code. The attacker tried for the fourth time and received the error code, and the attack stopped.

Thus, to defeat the attack, the system should transmit the error code before the attacker abandons the call. Once the attacker receives the error code, any subsequent Invites from the TN should also receive the error code.

By responding quickly to the Invite (<1 ms), the attack can be abated in two to ten seconds. If the error code is not sent before the abandonment, then the system will not have persuaded the attacker to give up the attack. Thus, the attack might continue until the attacker decides to give up.

In normal call processing, seven to ten percent of calls are abandoned. When a call abandons, a responsibility of the emergency services routing proxy (ESRP) is to deliver the ANI, whether received or computed. Thus, call processing continues to get information about the call to send to the PSAP. The PSAP puts abandoned calls into an abandoned call queue, and the PSAP could have some obligation to initiate a call back to the caller.

For calls that go to time-division multiplexing (TDM) and Request for Assistance Interface (RFAI) PSAPs, the ANI is always the received ANI. For wireless and VoIP calls, the ANI is always the pANI. The ESRP does not compute the true call back number for calls to TDM and RFAI PSAPs. Thus, if the CBN is not available, the system can use the pANI on a TDOS TN list maintained by the system.

For calls that go to i3 PSAPs, an additional data request (ADR) query can return the callback number. For an i3 PSAP, the pANI is delivered in the "From" header field, and the callback number is delivered in the "P-Asserted-Identity" field. The system can perform a determination of the CBN just before the Invite is sent to the i3 PSAP. There are instances where the true CBN might not be returned by the ADR.

In automatic TDOS detection, both the pANI and the CBN can be added to the list of TDOS TNs which are potentially conducting a TDOS attack.

In an abandoned call, the caller has been hooked to the Media Server, and the system plays a ringing signal. Once that is done, the ingress is signaled with an 18× message. The caller can interpret this signal as the call proceeding.

A TDOS attack uses a variety of resources. For example, it can use call routing resources of an emergency call management center (ECMC). it can use ingress resources of a PSAP, such as digital signal 0 (DS0) (e.g. voice) resources (for TDM) or bandwidth (for IP). Further, for a PSAP, the attack calls can go into the abandoned call queue. PSAPs have metrics on abandoned calls, and the attack makes the metrics of the PSAP look bad.

Thus, a goal before some implementations of the present disclosure is to detect and defeat the attack before the pANI pool is exhausted, pool-size permitting. Another goal might be to allow a "real" call, although it is using the same pANI(s), to be processed.

Figure 2:
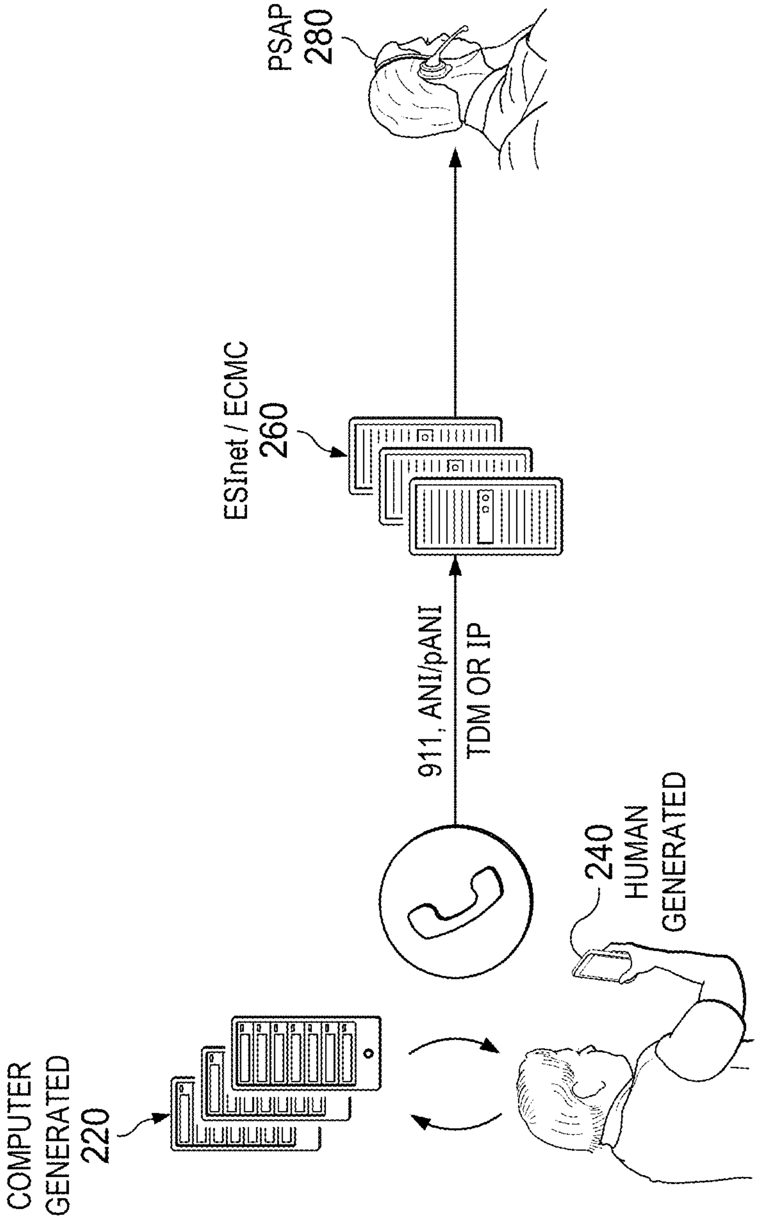
FIG. 2 illustrates exemplary devices during a TDOS attack.

FIG. 2 illustrates exemplary devices during a TDOS attack. The TDOS attack initially can be human-generated 240, computer-generated 220, or even a combination of the two. Calls repeatedly are made to emergency 911 services via time-division multiplexing (TDM) or Internet protocol (IP) technologies. In doing so, TNs are assigned to these calls: specifically, ANI or pANI numbers are assigned to these calls. These ANI and pANI numbers are a limited resource drawn from a pool of numbers.

The calls are received by an Emergency Services IP Network (ESInet) or ECMC 260. Conventionally, the ESInet/ECMC 260 forwards all of these calls to a PSAP 280, even if the calls are abandoned.

Many implementations of the algorithms of the present disclosure can be performed within the ESInet/ECMC 260.

Figure 3:
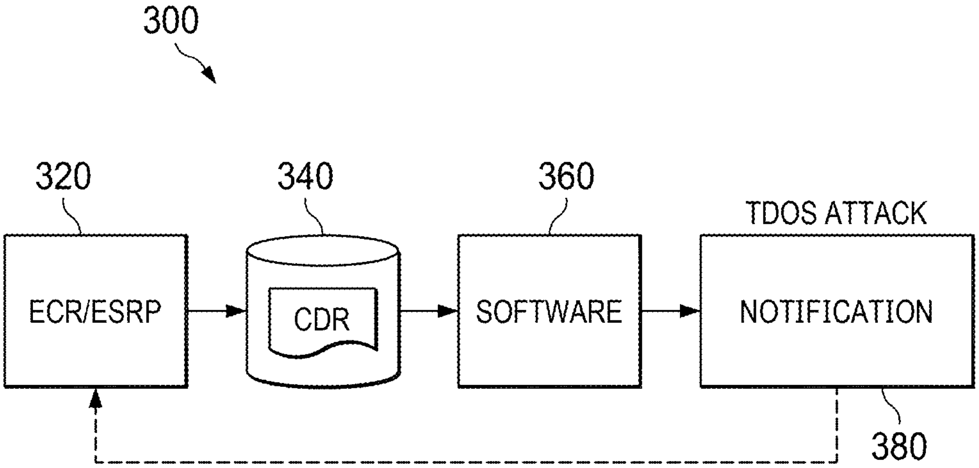
FIG. 3 illustrates a conceptual diagram within an emergency services IP network or emergency call management center, according to an implementation of the present disclosure.

FIG. 3 illustrates a conceptual diagram within the ESInet/ECMC, according to an implementation of the present disclosure. As illustrated in FIG. 3, the ESInet/ECMC 300 includes an ECR/ESRP 320, a call detail record (CDR) 340, and software 360.

As later discussed in connection with FIG. 5, various implementations of handling a TDOS attack begin with the ECR/ESRP 320 receiving a first call of the TDOS attack from an attacker. The first call, like many of the calls of the TDOS attack, quickly hang up. Thus, it can be difficult, if not impossible, for the ECR/ESRP 320 to determine whether the first call is a part of the TDOS attack during the call.

The ECR/ESRP 320 can record attributes of the calls of the attack in the CDR 340. These attributes can include, for example, one or more TNs and times associated with the call.

The software 360 can be a modified version of SWEEP produced by Intrado, in many implementations. The software 360 can access the attributes recorded in the CDR 340. Based on these attributes, the software 360 can determine that a TDOS attack is occurring. In such a situation, the software 360 can perform a notification 380 of a TDOS attack to the ECR/ESRP 320. Further, the software 360 can maintain the list of TDOS TNs.

The TDOS TN list generally tracks a respective TDOS attack flag in one or more TDOS TN data structures described later. That is, when the respective TDOS attack flag is set, the one or more TNs in the respective TDOS TN data structure are added to the list. When the respective TDOS attack flag is reset, the one or more TNS in the respective TDOS TN data structure can be removed from the list.

In some implementations, the TDOS TN list permits manual modification by human interaction. For example, a human can remove a TN from the TDOS TN list, because the human might know an extenuating circumstance why the TN triggered the TDOS handling.

On the other hand, the human can add a TN to the TDOS TN list for handling, although the TDOS handling was not automatically triggered for the TN. The later-described algorithms advantageously can include one or more operations to suitably handle a TN that did not automatically trigger the TDOS handling (e.g., was added by a human).

FIG. 4 shows an exemplary Abandoned TN data structure and an exemplary TDOS TN data structure, according to various implementations of the present disclosure.

The Abandoned TN data structure includes one or more TN fields, a Count field, an Occurred Time field, an ITG name field, a Trunk-Context field, and a TGRP field. The one or more TN fields each can indicate a TN (e.g., pANI, Pilot TN, Callback TN, or Billing TN) to which the rest of the data structure applies. In select implementations, the TN fields include a pANI number and/or a CBN number. For example, in a TDOS attack, the system can recognize an attack beginning with a Pilot TN, before the calls of the TDOS attack begin being assigned sentinel pANI TNs. In this situation, the pANI TNs can change for calls of the attack. However, the Pilot TN, the Callback TN, or the Billing TN for that call might not change. Thus, various implementations of the system can defeat an attack on a large pANI pool. The Count field indicates the number of calls that have been received from at least one of the TNs within a predetermined period of time. The Occurred Time field indicates the time at which a call is abandoned or received from at least one of the TNs.

The ITG name field or, alternatively, the trunk-context and TGRP (trunk group) fields can identify the incoming trunk of the call. An IP trunk group can have many trunk groups on the same facility. The trunk-context field can identify the name of the facility (IP trunk), and the TGRP field can identify an ITG name within that trunk-context. The TGRP can be a redefinition of an ITG name in the context of an IP trunk Group.

The TDOS TN data structure can include one or more TN fields, a Count field, an ITG name field, a Trunk-Context field, and a TGRP field. The TDOS TN data structure also can include a Start Time field that indicates a time at which the TDOS attack was identified (e.g., the time at which the first call of the attack was received or the time at which the system first recognized the attack). The TDOS TN data structure also can include a TDOS attack flag field that indicates whether an attack is being received from a TN in one of the TN fields. In several implementations, the TDOS Attack flag field defaults to FALSE.

The TDOS TN data structure also can include a banish attempts field that indicates a number of times that a banishment code was sent to the caller. The banish attempts field can default to 0.

The TDOS TN data structure also can include an interrogate flag field that indicates whether the call has passed an interrogation. In many implementations, this field defaults to TRUE.

The TDOS TN data structure also can include an interrogate count field that indicates a number of times the call has been interrogated. In several implementations, this field defaults to 0.

The TDOS TN data structure also can include a TDOS Inhibit Send flag field that indicates whether to inhibit sending the call to a PSAP. In various implementations, this field defaults to FALSE.

Of course, other fields and default values are possible, particularly if they maintain similar functionality to the disclosed fields and default values. Further, some implementations can exclude one or more fields.

Figure 5:
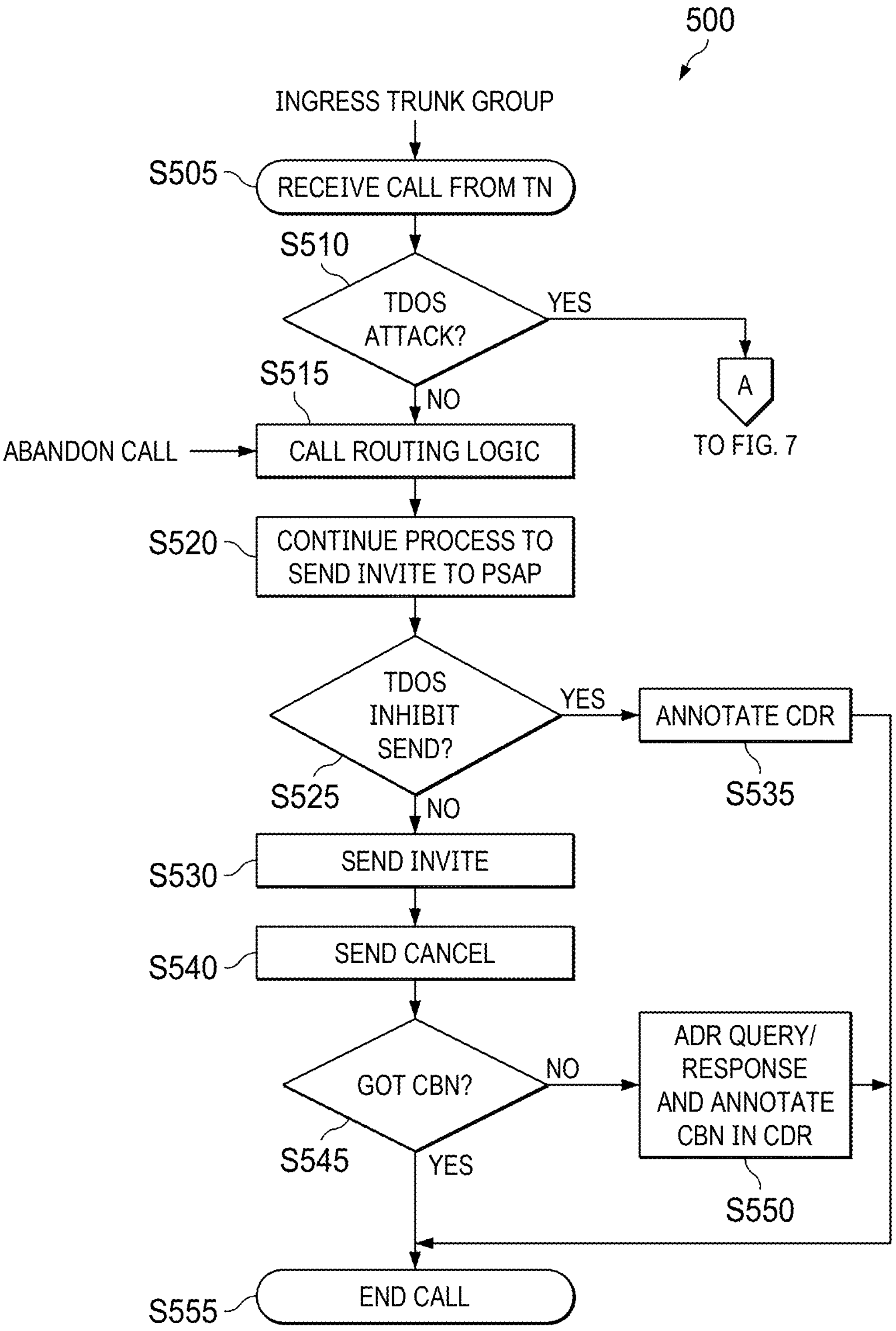
FIG. 5 illustrates an algorithm that can be performed by an ECR or ESRP to prevent a TDOS attack, according to an implementation of the present disclosure.

FIG. 5 illustrates an algorithm 500 that can be performed by an ECR or ESRP to prevent a TDOS attack, according to an implementation of the present disclosure. The algorithm 500 begins at S505 in which a network interface of the ECR/ESRP receives a call from an ingress trunk group. In many implementations of the present disclosure, this call is an emergency (e.g., 9-1-1) call. The ECR/ESRP receives a TN (e.g., a pANI) associated with the call such as the TN from which the call originated. The algorithm 500 then advances to S510.

In S510, a processor of the ECR/ESRP determines whether a TDOS attack flag has been set for the TN. The TDOS attack flag was discussed in connection with a field in the TDOS TN data structure of FIG. 4 and will be discussed in more detail in connection with S660 of FIG. 6. If the processor determines the TDOS attack flag has been set for the TN, then the algorithm 500 advances to off-page connector A, discussed in connection with FIG. 7. If the processor determines the TDOS attack flag has not been set, then the algorithm 500 advances to S515.

In many attacks, the call is abandoned at this point. In S515, the processor of the ECR/ESRP nonetheless can perform call routing logic. For example, the processor can determine one or more additional TNs of the call, using the ADR function. In addition, the processor can retrieve, based on the TN received in S505 or one of the additional TNs determined in S515, a TDOS TN data structure created based on a different call. The algorithm 500 then advances to S520.

In S520, the processor of the ECR/ESRP continues a process to send an Invite to the PSAP. This process can conform to the Session Initiation Protocol (SIP) and can be an Invite request, for example. The algorithm 500 then advances to S525.

In S525, the processor of the ECR/ESRP determines whether a TDOS Inhibit Send flag has been set for the TN or one of the additional TNs. The flag can be set in a field of the TDOS TN data structure retrieved in S515. The flag can be set for a different call in operation S750 discussed below, for example. If the processor determines the TDOS Inhibit Send flag has not been set, then the algorithm 500 advances to S530. If the processor determines the TDOS Inhibit Send flag has been set, the algorithm 500 advances to S535.

In S530, the processor of the ECR/ESRP sends an Invite to the PSAP in accordance with SIP, for example. The algorithm 500 then advances to S540.

In S540, the processor recognizes the caller has hung up the call, and the network interface transmits a Cancel to the PSAP. The algorithm 500 then advances to S545.

In S545, the processor determines whether a TN, such as the CBN, of the call was received. If the processor determines the TN was not received, then the algorithm 500 advances to S550.

In S550, the network interface of the ECR/ESRP transmits a query via the ADR for a TN, such as the CBN. The network interface receives a response from the ADR including the CBN. Thus, the network interface can receive the CBN for TDM and RFAI implementations, as well as making a second attempt at receiving the CBN for i3 implementations, if an earlier first attempt failed. The processor of the ECR/ESRP then annotates the CDR with the CBN and other information of the call, such as the ITG name and/or trunk-context and TGRP. This other information also can include, for example, the start time of the call, which can be inserted in the Occurred Time field of the Abandoned TN data structure: captured current timestamps can be part of the CDR in various implementations. Also in various implementations, the Disposition field of the CDR can be marked as a TDOS attack, so that the CDR indicates calls that were part of the attack. The algorithm 500 then advances to S555.

Returning to S545, if the processor determines the CBN was received, then the algorithm 500 advances to S555.

Returning to S525, if the processor determines the TDOS Inhibit Send flag has been set, the algorithm 500 advances to S535. In S535, the processor of the ECR/ESRP annotates the CDR with information associated with the call. This information can include, for example, call start time, call end time, call setup time, ingress information (where the call came from and from whom), identification of resources used, identification of the site that processed the call, identification of the software version of the ECR/ESRP, and identification of interactions with i3 components. This information can include, for example, the telephone number from which the call was received and the start time of the call. Further, the ECR/ESRP does not send the call to the PSAP as in S530. Thus, the PSAP can be saved from receiving attack calls. The algorithm 500 then advances to S555.

In S555, the processor of the ECR/ESRP can instruct the network interface to end the call.

Accordingly, in S550, the ECR/ESRP can use the i3 ADR function to obtain all TNs associated with the caller. These TNs can include a pANI, a Call Back Number (CBN), a Pilot TN, and/or an ALI Location TN.

Figure 6:
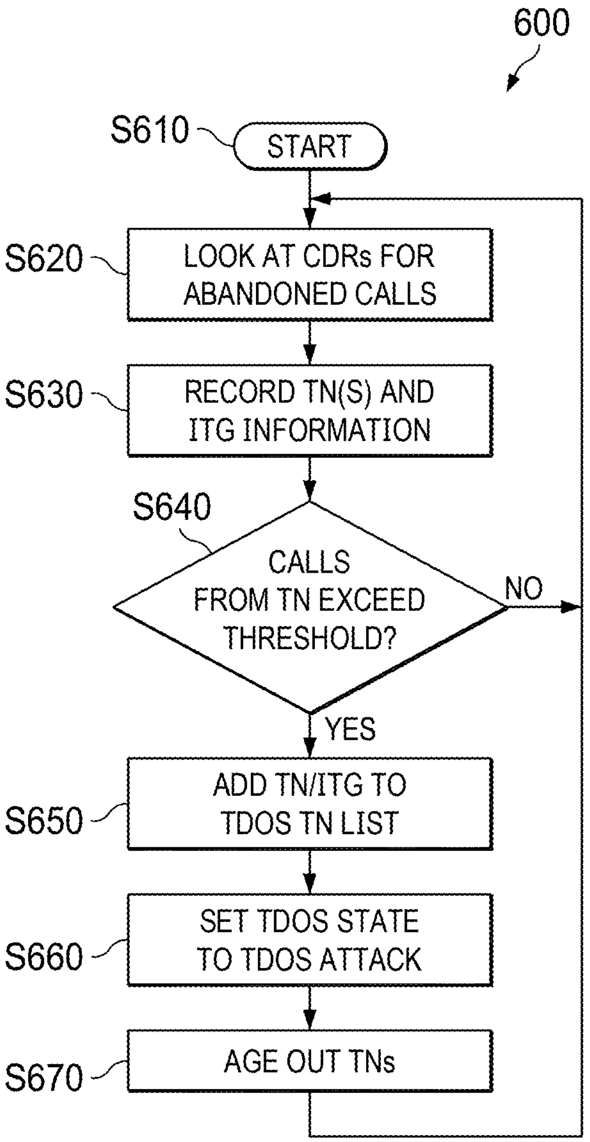
FIG. 6 illustrates an algorithm to prevent a TDOS attack, according to an implementation of the present disclosure.

FIG. 6 illustrates an algorithm 600 to prevent a TDOS attack, according to an implementation of the present disclosure. The algorithm 600 begins at S610 and advances to S620.

In S620, a processor of the ECR looks at one or more CDRs for abandoned calls. For example, the processor can filter the CDRs by the Disposition field indicating a call was abandoned. The algorithm 600 then advances to S630.

In S630, the processor records TNs and ITG information for each of the abandoned calls. The TNs can be, for example, a pANI, a CBN, a pilot TN, an ALI location TN, a billing TN, a main directory number (MDN), or a direct inward dial (DID) TN. For example, the processor can record this information in the Abandoned TN data structure illustrated in FIG. 4. The ITG information can be or include the ITG or trunk-context and TGRP. The algorithm 600 then advances to S640.

In S640, the processor determines whether a number of calls from a same TN within a predetermined period exceeds a predetermined threshold. One example of this predetermined threshold can be three calls from the same TN within two seconds. Of course, different thresholds or equivalencies of TNs are possible. If the processor determines the number of calls does not exceed the predetermined threshold, then the algorithm 600 returns to S620. If the processor determines the number of calls does exceed the predetermined threshold, then the algorithm 600 advances to S650.

In S650, the processor creates a TDOS TN data structure for the TN, as illustrated in exemplary FIG. 4. The processor can also add the TN/ITG to the TDOS TN list. For example, the processor can move fields of the Abandoned TN data structure to fields of the TDOS TN data structure. The pANI and the CBN can be included in one or more TN fields of the TDOS TN data structure.

Further, the processor can include in the TDOS TN data structure the ITG name or the trunk-context and TGRP. The processor also can include in the count field the number of calls determined to exceed the predetermined threshold in S640. The algorithm 600 then advances to S660.

In S660, the processor sets the TDOS attack flag field in the TDOS TN data structure to indicate an attack, e.g., TRUE. The algorithm 600 then advances to S670.

In S670, a processor executing the software 360 ages out the TN, if possible. This processor is not necessarily part of the ECR. When that processor detects the attack linked to the TN has stopped, the processor waits a predetermined period of time. Once the processor determines the period has expired and that no more calls for that attack have been received, the processor removes the TN from a TDOS TN list. For example, the processor can reset the TDOS Attack flag. This operation can prevent the ECR/ESRP from treating that TN as performing a TDOS attack. Thus, if a call is received from the TN after the reset, the call can be treated like a normal call (e.g., reporting an emergency). The algorithm 600 then returns to S620.

Figure 7:
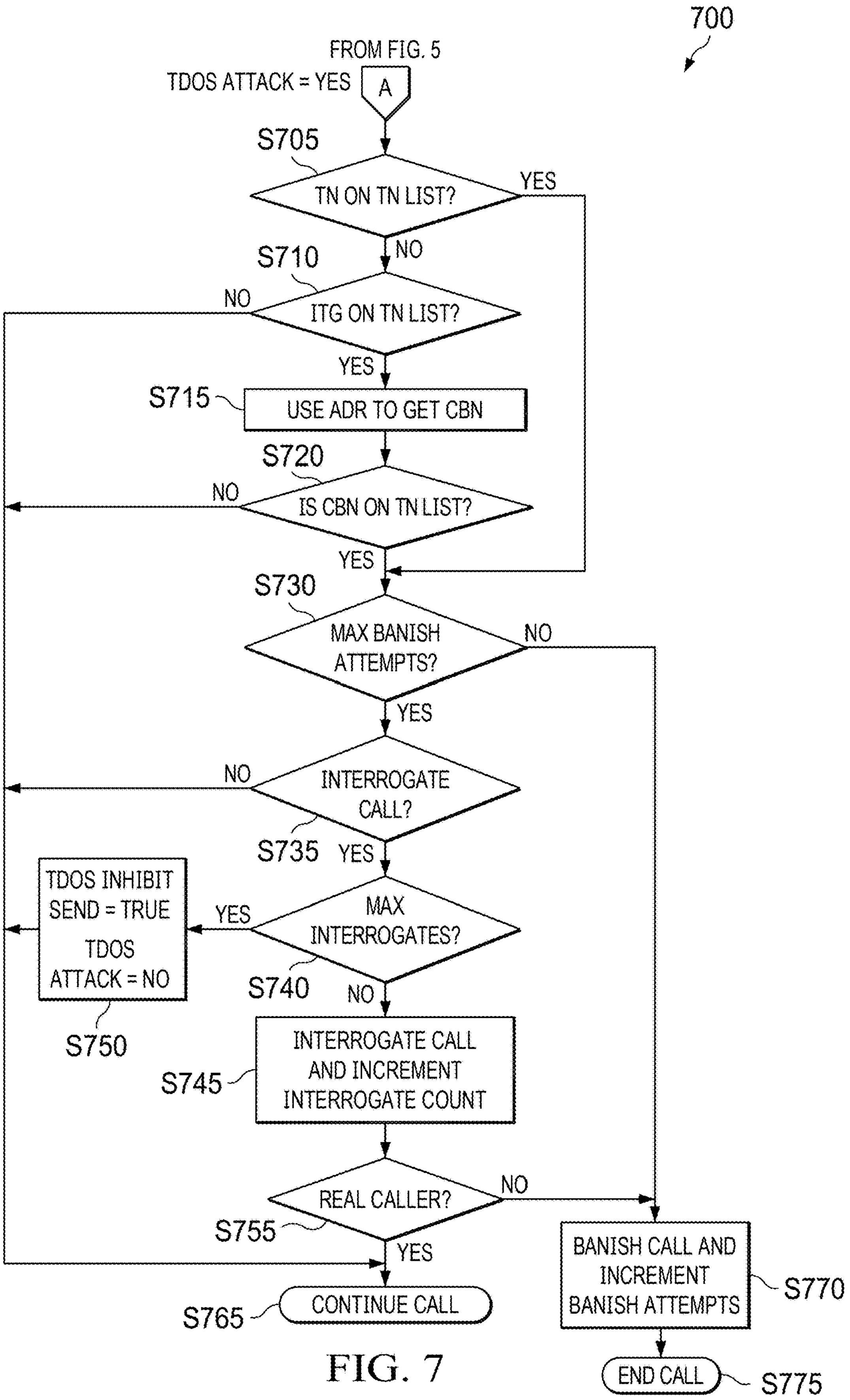
FIG. 7 illustrates an algorithm to prevent a TDOS attack, according to an implementation of the present disclosure.

FIG. 7 illustrates an algorithm 700 to prevent a TDOS attack, according to an implementation of the present disclosure. The algorithm 700 begins from off-page connector A from FIG. 5 and advances to S705.

In S705, the processor determines whether any TN of the call is on the TDOS TN list. For example, the processor can determine whether the Count field of the TDOS TN data structure associated with the TN exceeds a predetermined threshold. In one implementation, the predetermined threshold can be 1 (e.g., one more than the default value). If the processor determines the TN is on the TDOS TN list, then the algorithm 700 advances to S730. If the processor determines no TN of the call is on the TDOS TN list, then the algorithm 700 advances to S710.

In S710, the processor determines whether an ITG (e.g., trunk name) of the call is on the TDOS TN list. In at least one implementation, the processor can determine whether the contents of the ITG field of the TDOS TN data structure associated with the TN matches the ITG of the call. If the processor determines the ITG is not on the TDOS TN list, then the algorithm 700 advances to S765. If the processor determines the ITG is on the TDOS TN list, then the algorithm 700 advances to S715.

In S715, the processor uses an ADR to request the CBN of the call. The network interface then receives the CBN. The algorithm 700 then advances to S720.

In S720, the processor determines whether the CBN of the call is on the TDOS TN list. In at least one implementation, the processor can determine whether the contents of the CBN field of the TDOS TN data structure associated with the TN matches the CBN of the call. If the processor determines the CBN is not on the list, then the algorithm 700 advances to S765. If the processor determines the CBN is on the list, then the algorithm 700 advances to S730.

In S730, the processor determines whether a number of banish attempts for any of the TNs associated with the call has exceeded a predetermined threshold (e.g., 0) within a predetermined period of time (e.g., 10 or 30 minutes). The processor can determine the number of banish attempts based on the contents of the Banish Attempts field of the TDOS TN data structure for the TN, for example. If the processor determines the number of banish attempts for the TN has not exceeded the predetermined threshold, then the algorithm 700 advances to S770. If the processor determines the number of banish attempts for the TN has exceeded the predetermined threshold, then the algorithm 700 advances to S735.

In S735, the processor determines whether to interrogate the call. For example, the processor can determine whether to interrogate the call, based on the Interrogate flag field of the TDOS TN data structure for the TN. If the processor determines not to interrogate the call (e.g., because the Interrogate flag field is FALSE), then the algorithm 700 advances to S765. If the processor determines to interrogate the call (e.g., because the Interrogate flag field is TRUE), then the algorithm 700 advances to S740.

In S740, the processor determines whether a number of interrogations of the TN in a predetermined period exceeds a predetermined threshold (e.g., 0 or 1). For example, the processor can determine the number of interrogations of the TN based on the Interrogate Count field of the TDOS TN data structure for the TN. If the processor determines the number of interrogations of the TN does not exceed the predetermined threshold, then the algorithm 700 advances to S745. If the processor determines the number of interrogations of the TN exceeds the predetermined threshold, then the algorithm 700 advances to S750.

In S745, the call is interrogated. For example, a live operator can ask the caller about the reason for their call. In the context of an E-9-1-1 call, the operator can ask about the emergency. In other implementations, the system can play a prerecorded voice message prompting the caller to vocally identify the reason for their call. In select implementations, the system can play a prerecorded voice message initiating a menuing operation. In some implementations, the call can be routed based on the response. To defeat a TDOS attack, the response is not as important as dissuading the caller from continuing the attack by indicating the monitoring of their actions.

In addition, the processor can increment the interrogate count, for example, in the Interrogate Count field of the TDOS TN data structure for the TN. The algorithm 700 then advances to S755.

Briefly returning to S740, if the number of interrogations of the TN exceeds the predetermined threshold, then the algorithm 700 advances to S750. In S750, the processor sets the TDOS Inhibit Send flag field to TRUE and resets the TDOS Attack flag field to FALSE. The algorithm 700 then advances to S765.

In S755, the processor determines whether the call has a real caller. For example, in at least one implementation in which a live operator interrogates the caller, the operator can indicate to the system that the caller vocally confirmed that there is an emergency. In at least one implementation in which a prerecorded message interrogates the caller, the processor can confirm receipt of a vocal response from the caller or, using voice recognition technology, that the content of the vocal response is relevant to the presumed purpose of the call (e.g., an emergency). In at least one implementation using menuing performing interrogation, the processor can determine whether a dual-tone multi-frequency (DTMF) signal ("touch-tone") signal was received from the caller and, in select implementations, the meaning of the DTMF signal.

If the processor determines the call has a real caller (e.g., the system received a vocal or DTMF response to the interrogation in S745 within a predetermined period of time), then the processor sets the Interrogate flag field to FALSE and advances to S765. If the processor determines the call does not have a real caller (e.g., the system did not receive a vocal or DTMF response to the interrogation within the predetermined period of time), then the algorithm 700 advances to S770.

In S765, the processor allows the call to continue via normal call processing, leading to the call being sent to the PSAP.

In S770, the processor banishes the call. For example, the processor can instruct the network interface to transmit a signal to the caller. The signal indicates the number (e.g. 911 or pilot) dialed by the attacker is unassigned. Additionally, in some implementations, the processor transfers the call to a non-emergency number of the PSAP. Thus, the PSAP still receives the call but does so without dedicating emergency resources to the call. Further, in one implementation, the processor simply hangs up the call. In addition, the processor increments the Banish Attempts field of the TDOS TN data structure.

The algorithm 700 then can advance to S775 and end the call.

Thus, during a TDOS attack, the processor typically first determines the attack by the CBN being on the TDOS TN list at S720. When the processor confirms the CBN is on the TDOS TN list at S720, the processor attempts banishment of the caller at S770. There is some possibility that these operations do not defeat the attack, because of the amount of time it takes to get the CBN at S715. During this time, any calls in the pANI pool that are not an attack are processed normally. If the CBN can be banished, the pANI pool might be saved from exhaustion, depending on the size of the pANI pool.

When the pANI pool is exhausted, the sentinel TN is used for all calls. Accordingly, the ECR/ESRP can determine in S705 that the sentinel pANI has been placed on the TDOS TN list by virtue of having reached the system's threshold of signaling an attack. Thus, the system can banish all calls to the pANI, potentially including real calls. In many implementations, this banishment can occur within a millisecond. The system banishes pANIs until the processor determines the maximum banishment attempts are reached at S730. If the banishment operations work, the attack can be defeated in 2 to 10 seconds.

If the attack is not defeated in this time (e.g., within 2 to 10 seconds), then the processor can determine the banishment attempts of the TN have reached the predetermined threshold at S730. Because real calls might use the pANI under attack, the call interrogator is then used to determine whether the caller is real at S745.

If the processor determines at S755 that the caller is not real (e.g., the caller does not respond to the interrogator), then the processor performs banishment of the call at S770.

Due to a delay in banishing, the banishment might not occur before the call hangs up. Hence, the banishment might not work, and the attack might continue. Thus, interrogation of calls associated with the CBN or TN continues until the processor determines the interrogation count threshold has been reached at S740. Then, if the banishment is ineffective, the processor can stop banishment of calls from the TN at S750.

In use, the ECR/ESRP receives a plurality of calls, such as two, three, or more calls within a predetermined period of time. If the attack continues, during the next call from the TN, the ECR/ESRP performs the normal call processing in S515. But if the pANI or CBN of the next call are on the TDOS TN list (or, e.g., if TN fields of a TDOS TN data structure identify the pANI or the CBN), the ESRP shields the PSAP from the attack by branching at S525 away from sending an Invite at S530.

Further, the ECR/ESRP can attempt to obtain the location of the caller for use by law enforcement. In doing so, the ECR/ESRP can use Dispatch location methods, which can have a time limit of 15 seconds, instead of Routing location methods, which have a time limit of 1.4 secs. The ECR/ESRP can contact the carrier and law enforcement with the location at S535.

Some implementations of the algorithms of FIGS. 5-7 can decrease the time period where a real call can be banished (e.g., from two to ten seconds) but increase the probability of actually defeating the attack. For example, the algorithms can use interrogation if banishing the call has failed, while allowing real callers to get through to the PSAP. If the attack is persistent, TDOS mitigation (e.g., banishment) can be stopped, and the Invite to the PSAP can be suppressed in S525 for those calls that are an attack.

In a modification of the above disclosure, the system keeps a count of how many calls have received banishment (e.g., the error code treatment) within a predetermined period of time. In experiments, attacks have been defeated within four to twelve calls. Thus, if the attack persists beyond twelve calls, call interrogation can be invoked on every call, regardless of the TN. In such an implementation, real callers can pass the interrogator.

Figure 8:
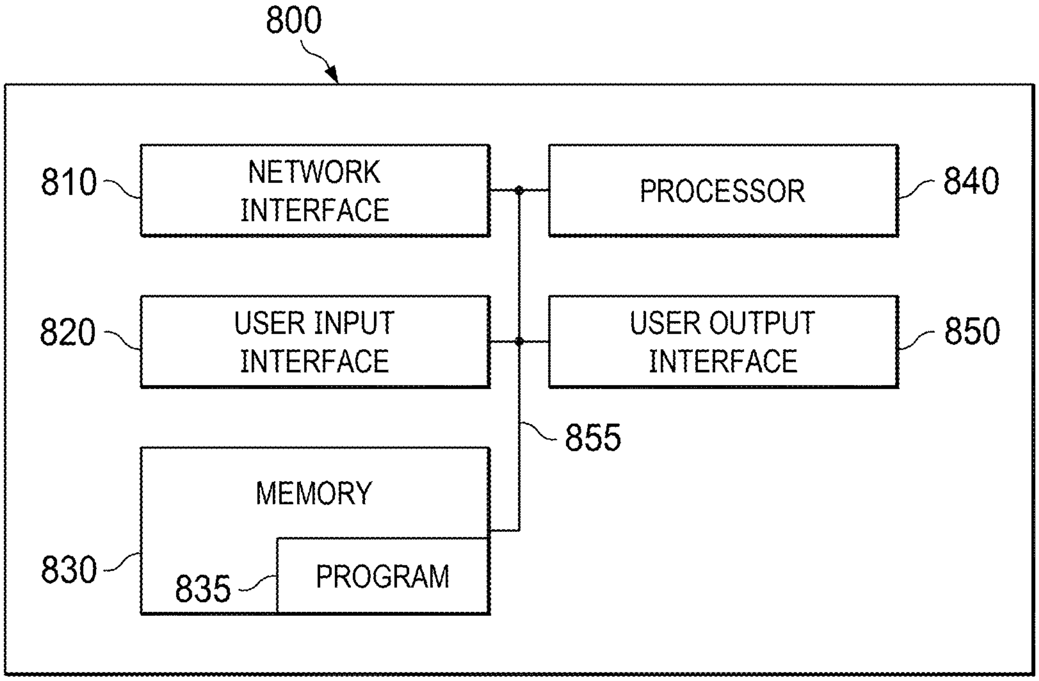
FIG. 8 illustrates a computing device, according to an implementation of the present disclosure.

FIG. 8 illustrates a computing device 800, according to an implementation of the present disclosure. The ESInet/ECMC 260, the PSAP 280, and/or the ECR/ESRP 320 can be implemented by the computing device 800. Further, the CDR 340 can be stored in the computing device 800, and the software 360 can be executed by the computing device 800.

The computing device 800 can include a network interface 810, a user input interface 820, a memory 830, a program 835, a processor 840, a user output interface 850, and a bus 855.

Although illustrated within a single housing, the computing device 800 can be distributed across plural housings or sub-systems that cooperate in executing program instructions. In some implementations, the computing device 800 can include one or more blade server devices, standalone server devices, personal computers (including laptop computers and tablet computers), routers, hubs, switches, bridges, firewall devices, intrusion detection devices, mainframe computers, network-attached storage devices, smartphones and other mobile telephones, and other computing devices. Although the system executes the Windows OS, macOS, or Linux in many implementations, the system hardware can be configured according to a Symmetric Multi-Processing (SMP) architecture or a Non-Uniform Memory Access (NUMA) architecture.

The network interface 810 provides one or more communication connections and/or one or more devices that allow for communication between the computing device 800 and other computing systems (not shown) over a communication network, collection of networks (not shown), or the air, to support the detection and handling of a TDOS attack, outlined herein. The network interface 810 can communicate using various networks (including both internal and external networks) such as near-field communications (NFC), Wi-Fi™, Bluetooth, Ethernet, cellular (e.g., 3G, 4G, 5G), white space, 802.11x, satellite, Bluetooth, LTE, GSM/HSPA, CDMA/EVDO, DSRC, CAN, GPS, facsimile, or any other wired or wireless interface. Other interfaces can include physical ports (e.g., Ethernet, USB, HDMI, etc.), interfaces for wired and wireless internal subsystems, and the like. Similarly, nodes and user equipment (e.g., mobile devices) of the system can also include suitable interfaces for receiving, transmitting, and/or otherwise communicating data or information in a network environment.

The user input interface 820 can receive one or more inputs from a human. The user input interface 820 can be or include a mouse, a touchpad, a keyboard, a touchscreen, a trackball, a camera, a microphone, a joystick, a game controller, a scanner, and/or any other input device.

The memory 830, also termed a "storage," can include or be one or more computer-readable storage media readable by the processor 840 and that store software. The memory 830 can be implemented as one storage device or across multiple co-located or distributed storage devices or sub-systems. The memory 830 can include additional elements, such as a controller, that communicate with the processor 840. The memory 830 can also include storage devices and/or sub-systems on which data and/or instructions are stored. The computing device 800 can access one or more storage resources to access information to carry out any of the processes indicated in this disclosure and, in particular, FIGS. 5-7. In various implementations, the memory 830 stores the program 835 to execute at least a portion of the algorithms illustrated in FIGS. 5-7. Further, the program 835, when executed by the computing device 800 generally and/or the processor 840 specifically, can direct, among other functions, performance of the operations of detection and handling of a TDOS attack, as described herein.

The memory 830 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a field programmable gate array (FPGA), a hard drive, a cache memory, a flash memory, a removable disk, or a tape reel. The memory 830 can be or include resistive RAM (RRAM) or a magneto-resistive RAM (MRAM). The information being tracked, sent, received, or stored in the communication system can be provided in any database, register, table, cache, queue, control list, or storage structure, based on particular implementations, all of which could be referenced in any suitable timeframe.

The processor 840 (e.g., a processing unit) can be or include one or more hardware processors and/or other circuitry that retrieve and execute software, especially the program 835, from the memory 830. The processor 840 can be implemented within one processing device, chip, or package and can also be distributed across multiple processing devices, chips, packages, or sub-systems that cooperate. In some implementations, the processor 840 is or includes a Graphics Processing Unit (GPU).

The processor 840 can have any register size, such as a 32-bit register or a 64-bit register, among others. The processor 840 can include multiple cores. Implementations of the processor 840 are not limited to any particular number of threads. The processor 840 can be fabricated by any process technology, such as 14 nm process technology.

The user output interface 850 outputs information to a human user. The user output interface 850 can be or include a display (e.g., a screen), a touchscreen, speakers, a printer, or a haptic feedback unit. In many implementations, the user output interface 850 can be combined with the user input interface 820. For example, some such implementations include a touchscreen, a headset including headphones and a microphone, or a joystick with haptic feedback.

In implementations including multiple computing devices, a server of the system or, in a serverless implementation, a peer can use one or more communications networks that facilitate communication among the computing devices to achieve the detection and handling of a TDOS attack, as outlined herein. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, an ASIC, and cache memory, and to transitory storage media, such as carrier waves or propagating signals.

Aspects of the system can be implemented in various manners, e.g., as a method, a system, a computer program product, or one or more computer-readable storage media. Accordingly, aspects of the present disclosure can take the form of a hardware implementation, a software implementation (including firmware, resident software, or micro-code) or an implementation combining software and hardware aspects that can generally be referred to herein as a "module" or a "system." Functions described in this disclosure can be implemented as an algorithm executed by one or more hardware processing units, e.g., the processor 840. In various embodiments, different operations and portions of the operations of the algorithms described can be performed by different processing units. In some implementations, the operations can be achieved by reciprocating software in any of the ESInet/ECMC 260, the PSAP 280, and/or the ECR/ESRP 320 can be executed by the computing device 800. The software 360 can be implemented using reciprocating software. Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacture of these devices and systems.

Any suitable permutation can be applied to a physical implementation, including the design of the communications network in which the system is implemented. In one embodiment, the bus 855 can share hardware resources with the memory 830 and the processor 840. In this alternative implementation, the computing device 800 can be provided with separate hardware resources including one or more processors and memory elements.

In example implementations, various other components of the computing device 800 can be installed in different physical areas or can be installed as single units.

The communication system can be configured to facilitate communication with machine devices (e.g., vehicle sensors, instruments, electronic control units (ECUs), embedded devices, actuators, displays, etc.) through the bus 855. Other suitable communication interfaces can also be provided for an Internet Protocol (IP) network, a user datagram protocol (UDP) network, or any other suitable protocol or communication architecture enabling network communication with machine devices.

The innovations in this detailed description can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable, non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. A non-transitory, computer-readable storage medium can include instructions to allow one or more processors to carry out the emulation.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions on one chip substrate. Other implementations can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. For example, various modifications and changes can be made to the arrangements of components. The description and drawings are, accordingly, to be regarded in an illustrative sense, not in a restrictive sense.

The numerous examples provided herein described interaction in terms of two, three, or more electrical components for purposes of clarity and example. The system can be consolidated in any manner. Along similar design alternatives, the illustrated components, modules, and elements of the drawings can be combined in various possible configurations within the scope of this disclosure. In certain cases, one or more of the functionalities of a given set of flows might be more clearly described by referencing a limited number of electrical elements. The electrical circuits of the drawings are readily scalable and can accommodate many components, as well as more complicated/sophisticated arrangements and configurations. Accordingly, the provided examples do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation," "example implementation," "an implementation," "another implementation," "some implementations," "various implementations," "other implementations," "alternative implementation," and the like are intended to mean that any such features can be included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example M1, a method includes receiving a first call; identifying a first telephone number associated with the first call; receiving a second call; identifying a second telephone number associated with the second call; determining to banish the second call, at least in part based the second telephone number and a determination that a number of calls associated with the first telephone number exceeds a predetermined threshold; and banishing the second call.

Example M2 is the method of Example M1, wherein the first telephone number is a call back number for the first call, and the second telephone number is a call back number for the second call.

Example M3 is the method of Example M2, further comprising: recording a first ingress trunk group of the first call, at least in part based on the determination that the number of calls associated with the first telephone number exceeds the predetermined threshold; and determining whether the first telephone number matches the second telephone number, at least in part based on the first ingress trunk group and a second ingress trunk group of the second call.

Example M4 is the method of any of Examples M1-M3, wherein the determining to banish the second call is performed at least in part based on the determination that the number of calls associated with the first telephone number exceeds the predetermined threshold.

Example M5 is the method of any of Examples M1-M4, wherein the first telephone number is a pseudo Automatic Number Identification (pANI) number, a call back number, a pilot telephone number, or an Automatic Location and Information (ALI) location telephone number.

Example M6 is the method of any of Examples M1-M5, further comprising: interrogating the second call, at least in part based on a determination that a telephone number associated with the first call or the second call has been banished more than a predetermined number of times.

Example M7 is the method of any of Examples M1-M6, further comprising: ending the second call, at least in part based on a determination that a number of interrogations exceeds a predetermined threshold.

In Example A1, an apparatus includes a network interface that receives a first call and a second call; and a processor configured to identify a first telephone number associated with the first call, to identify a second telephone number associated with the second call, and to determine to banish the second call, at least in part based the second telephone number and a determination that a number of calls associated with the first telephone number exceeds a predetermined threshold, wherein the second call is banished.

Example A2 is the apparatus of Example A1, wherein the first telephone number is a call back number for the first call, and the second telephone number is a call back number for the second call.

Example A3 is the apparatus of Example A2, wherein the processor is further configured to record a first ingress trunk group of the first call, at least in part based on the determination that the number of calls associated with the first telephone number exceeds the predetermined threshold, and the processor is further configured to determine whether the first telephone number matches the second telephone number, at least in part based on the first ingress trunk group and a second ingress trunk group of the second call.

Example A4 is the apparatus of any of Examples A1-A3, wherein the processor is further configured to determine to banish the second call at least in part based on the determination that the number of calls associated with the first telephone number exceeds the predetermined threshold.

Example A5 is the apparatus of any of Examples A1-A4, wherein the first telephone number is a pseudo Automatic Number Identification (pANI) number, a call back number, a pilot telephone number, or an Automatic Location and Information (ALI) location telephone number.

Example A6 is the apparatus of any of Examples A1-A5, wherein the second call is interrogated, at least in part based on a determination that a telephone number associated with the first call or the second call has been banished more than a predetermined number of times.

Example A7 is the apparatus of any of Examples A1-A6, wherein the second call is ended, at least in part based on a determination that a number of interrogations exceeds a predetermined threshold.

In Example C1, a computer-readable medium includes instructions that, when executed by a processor, perform operations including receiving a first call; identifying a first telephone number associated with the first call; receiving a second call; identifying a second telephone number associated with the second call; and determining to banish the second call, at least in part based the second telephone number and a determination that a number of calls associated with the first telephone number exceeds a predetermined threshold, wherein the second call is banished.

Example C2 is the medium of Example C1, wherein the first telephone number is a call back number for the first call, and the second telephone number is a call back number for the second call.

Example C3 is the medium of Example C2, the operations further comprising: recording a first ingress trunk group of the first call, at least in part based on the determination that the number of calls associated with the first telephone number exceeds the predetermined threshold; and determining whether the first telephone number matches the second telephone number, at least in part based on the first ingress trunk group and a second ingress trunk group of the second call.

Example C4 is the medium of any of Examples C1-C3, wherein the determining to banish the second call is performed at least in part based on the determination that the number of calls associated with the first telephone number exceeds the predetermined threshold.

Example C5 is the medium of any of Examples C1-C4, wherein the first telephone number is a pseudo Automatic Number Identification (pANI) number, a call back number, a pilot telephone number, or an Automatic Location and Information (ALI) location telephone number.

Example C6 is the medium of any of Examples C1-C5, wherein the second call is interrogated, at least in part based on a determination that a telephone number associated with the first call or the second call has been banished more than a predetermined number of times.

Example C7 is the medium of any of Examples C1-C6, the operations further comprising: ending the second call, at least in part based on a determination that a number of interrogations exceeds a predetermined threshold.

In Example F1, an apparatus includes means for receiving a first call and a second call; and processing means for identifying a first telephone number associated with the first call, for identifying a second telephone number associated with the second call, and for determining to banish the second call, at least in part based the second telephone number and a determination that a number of calls associated with the first telephone number exceeds a predetermined threshold, wherein the second call is banished.

Example F2 is the apparatus of Example F1, wherein the first telephone number is a call back number for the first call, and the second telephone number is a call back number for the second call.

Example F3 is the apparatus of Example F2, wherein the processing means records a first ingress trunk group of the first call, at least in part based on the determination that the number of calls associated with the first telephone number exceeds the predetermined threshold, and determines whether the first telephone number matches the second telephone number, at least in part based on the first ingress trunk group and a second ingress trunk group of the second call.

Example F4 is the apparatus of any of Examples F1-F3, wherein the processing means determines to banish the second call at least in part based on the determination that the number of calls associated with the first telephone number exceeds the predetermined threshold.

Example F5 is the apparatus of any of Examples F1-F4, wherein the first telephone number is a pseudo Automatic Number Identification (pANI) number, a call back number, a pilot telephone number, or an Automatic Location and Information (ALI) location telephone number.

Example F6 is the apparatus of any of Examples F1-F5, wherein the second call is interrogated, at least in part based on a determination that a telephone number associated with the first call or the second call has been banished more than a predetermined number of times.

Example F7 is the apparatus of any of Examples F1-F6, wherein the second call is ended, at least in part based on a determination that a number of interrogations exceeds a predetermined threshold.

I claim:

1. A method, comprising:

receiving a first call;

identifying a first telephone number associated with the first call, wherein the first telephone number is a call back number for the first call;

receiving a second call;

identifying a second telephone number associated with the second call, wherein the second telephone number is a call back number for the second call;

determining to banish the second call, at least in part based on the second telephone number and a determination that a number of calls associated with the first telephone number exceeds a predetermined threshold; and banishing the second call, wherein the banishing includes sending an error/cause code to a caller of the second call;

recording a first ingress trunk group of the first call, at least in part based on the determination that the number of calls associated with the first telephone number exceeds the predetermined threshold; and determining whether the first telephone number matches the second telephone number, at least in part based on the first ingress trunk group and a second ingress trunk group of the second call.

2. The method of claim 1, wherein the first telephone number is a pseudo Automatic Number Identification (pANI) number, a call back number, a pilot telephone number, or an Automatic Location and Information (ALI) location telephone number.

3. The method of claim 1, further comprising:

interrogating the second call, at least in part based on a determination that a telephone number associated with the first call or the second call has been banished more than a predetermined number of times.

4. The method of claim 3, wherein the interrogating includes answering the second call.

5. The method of claim 1, further comprising:

ending the second call, at least in part based on a determination that a number of interrogations exceeds a predetermined threshold.

6. The method of claim 1, wherein the error/cause code indicates that a number dialed by the caller is unassigned.

7. The method of claim 1, wherein the first call is an emergency call.

8. An apparatus, comprising:

a network interface that receives a first call and a second call; and a processor configured to identify a first telephone number associated with the first call, wherein the first telephone number is a call back number for the first call, to identify a second telephone number associated with the second call, wherein the second telephone number is a call back number for the second call, and to determine to banish the second call, at least in part based on the second telephone number and a determination that a number of calls associated with the first telephone number exceeds a predetermined threshold, wherein the second call is banished by sending an error/cause code to a caller of the second call, wherein the processor is further configured to record a first ingress trunk group of the first call, at least in part based on the determination that the number of calls associated with the first telephone number exceeds the predetermined threshold, and the processor is further configured to determine whether the first telephone number matches the second telephone number, at least in part based on the first ingress trunk group and a second ingress trunk group of the second call.

9. The apparatus of claim 8, wherein the first telephone number is a pseudo Automatic Number Identification (pANI) number, a call back number, a pilot telephone number, or an Automatic Location and Information (ALI) location telephone number.

10. The apparatus of claim 8, wherein the second call is interrogated, at least in part based on a determination that a telephone number associated with the first call or the second call has been banished more than a predetermined number of times.

11. The apparatus of claim 10, wherein the second call is interrogated by answering the second call.

12. The apparatus of claim 8, wherein the second call is ended, at least in part based on a determination that a number of interrogations exceeds a predetermined threshold.

13. The apparatus of claim 8, wherein the error/cause code indicates that a number dialed by the caller is unassigned.

14. The apparatus of claim 8, wherein the first call is an emergency call.

15. A computer-readable medium including instructions that, when executed by a processor, perform operations comprising:

receiving a first call;

identifying a first telephone number associated with the first call, wherein the first telephone number is a call back number for the first call;

receiving a second call;

identifying a second telephone number associated with the second call, wherein the second telephone number is a call back number for the second call; and determining to banish the second call, at least in part based on the second telephone number and a determination that a number of calls associated with the first telephone number exceeds a predetermined threshold, wherein the second call is banished by sending an error/cause code to a caller of the second call;

recording a first ingress trunk group of the first call, at least in part based on the determination that the number of calls associated with the first telephone number exceeds the predetermined threshold; and determining whether the first telephone number matches the second telephone number, at least in part based on the first ingress trunk group and a second ingress trunk group of the second call.

16. The medium of claim 15, wherein the second call is interrogated, at least in part based on a determination that a telephone number associated with the first call or the second call has been banished more than a predetermined number of times.

17. The medium of claim 16, wherein the second call is interrogated by answering the second call.

18. The medium of claim 15, the operations further comprising:

ending the second call, at least in part based on a determination that a number of interrogations exceeds a predetermined threshold.

19. The medium of claim 15, wherein the error/cause code indicates that a number dialed by the caller is unassigned.

20. The medium of claim 15, wherein the first call is an emergency call.

* * * * *